United States Patent
Krishnan et al.

(10) Patent No.: US 8,159,936 B2
(45) Date of Patent: Apr. 17, 2012

(54) NETWORK CONVERGENCE IN RESPONSE TO A TOPOLOGY CHANGE

(75) Inventors: Ram Krishnan, Sunnyvale, CA (US); Prakash Kashyap, Cupertino, CA (US)

(73) Assignee: Extreme Networks, Inc., Santa Clara, CA (US)

( * ) Notice: Subject to any disclaimer, the term of this patent is extended or adjusted under 35 U.S.C. 154(b) by 149 days.

(21) Appl. No.: 12/416,001

(22) Filed: Mar. 31, 2009

(65) Prior Publication Data

US 2010/0246387 A1    Sep. 30, 2010

(51) Int. Cl.
*H04L 12/26* (2006.01)
(52) U.S. Cl. ........................................ 370/222; 370/217
(58) Field of Classification Search .......... 370/225–228, 370/241, 242, 244–245, 248, 254–258, 216–217, 370/221–222
See application file for complete search history.

(56) References Cited

U.S. PATENT DOCUMENTS

| 2005/0094634 A1* | 5/2005 | Santhanakrishnan et al. ............ 370/389 |
| 2010/0039961 A1* | 2/2010 | Tallet et al. ........... 370/256 |
| 2010/0165834 A1* | 7/2010 | Holness et al. ........ 370/225 |

FOREIGN PATENT DOCUMENTS

| WO | WO-2008107883 | 9/2008 |
| WO | WO-2009021554 | 2/2009 |

OTHER PUBLICATIONS

International Search Report and Written Opinion for PCT Application No. PCT/US2010/029505 Mailed Aug. 13, 2010, 13 Pages.

* cited by examiner

*Primary Examiner* — Aung S Moe
*Assistant Examiner* — Feben M Haile
(74) *Attorney, Agent, or Firm* — Blakely, Sokoloff, Taylor & Zafman

(57) ABSTRACT

In response to a network topology change, packets are initially flooded on ports of a network device. In addition, a bit array is cleared in response to the topology change. Each bit in the bit array is associated with a particular forwarding entry on the network device. In connection with the clearing of the bit array, the flooding of packets on ports of the network device is made conditional, reducing failover time of the network.

19 Claims, 4 Drawing Sheets

NETWORK CONVERGENCE IN RESPONSE TO A TOPOLOGY CHANGE

FIELD

Embodiments described herein relate to packet networks and, more particularly, to reducing convergence time of a network in response to a link failure.

BACKGROUND

Network devices frequently employ some kind of forwarding scheme to forward packets to various destinations on a network. Such forwarding schemes commonly include maintaining a forwarding database that has forwarding entries. A forwarding entry will typically have at least a destination address and a corresponding port. Thus, when an incoming packet arrives at a network device having the destination address in its packet header, a lookup of the forwarding database for that destination address will return a port number that tells the network device which port it should use to send the packet back out to the network.

In various types of networks, including ring networks, changes in the topology of the network are, for practical purposes, inevitable. When the topology of a network changes, the forwarding entries maintained in the forwarding database of the network device often become invalid, or at least incorrect. Thus, a typical response to a topology change is to perform an operation that flushes the entries in the forwarding database. In other words, the forwarding entries in the forwarding database are flushed, or deleted, on network devices so that forwarding entries can be relearned for various destination addresses to indicate valid forwarding information. In connection with the flushing of a forwarding database, packet flooding is often used to ensure that packets reach their destination during the time between flushing and relearning of the various forwarding entries. Flooding involves forwarding a copy of a packet on all ports of a network device that are associated with a particular network. So, when a forwarding database is flushed, all of the entries are invalidated and, thus, any incoming packet will trigger a forwarding database (or FDB) lookup that indicates there is no valid entry for the particular destination address associated with the packet. Accordingly, the packet will be flooded out on all ports of the network device associated with the particular network.

One challenge presented by flushing (along with the coinciding flooding and relearning) in response to a network topology change is that flushing forwarding entries can take a long time. For example, it is common for forwarding databases to be organized as a hash table, which adds complexity. Also, some forwarding databases may be very large, with upwards of 500K media access control (MAC) addresses. Not only can flushing and the subsequent relearning take a long time, but it is often the case that many entries are flushed/deleted unnecessarily. For example, a topology change might only involve the failure of a single link in the network and perhaps less than 50 percent of the network topology is affected by the failed link. Unfortunately, flushing is color-blind in that flushing is a one-size-fits-all solution and does not take into account ports and/or links on the network that are unaffected by the topology change.

SUMMARY OF THE DESCRIPTION

In response to a network topology change, packets are initially flooded on ports of a network device. Forwarding database entries are not flushed. In addition, a bit array is cleared in response to the topology change. Each bit in the bit array is associated with a particular forwarding entry on the network device. In connection with the clearing of the bit array, the flooding of packets on ports of the network device is made conditional, reducing failover time of the network. The conditional flooding overrides the initial flooding. The conditional flooding may include determining the state of the bit associated with a particular forwarding entry in the bit array and terminating flooding related to that particular forwarding entry if the bit indicates that the forwarding entry has been relearned.

BRIEF DESCRIPTION OF DRAWINGS

The following description includes discussion of figures having illustrations given by way of example of implementations of embodiments of the invention. The drawings should be understood by way of example, not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

As provided herein, methods, apparatuses, and systems manage topology changes in a network, such as a ring network. Rather than flushing a forwarding database in response to a topology change and then relearning forwarding entries on a network device, various embodiments described herein perform conditional flooding of packets to reduce the failover time of the network. As used herein, the term "failover time" refers to the amount of time it takes for a network to converge after a topology change (e.g., the time it takes to re-learn forwarding entries).

Embodiments described herein are particularly relevant in hardware-based forwarding solutions. Forwarding packets in hardware is often referred to as "fast-path" forwarding while forwarding packets in software is often referred to as "slow-path" forwarding. This is because if a packet to be forwarded does not generate a hit on a forwarding entry in hardware (e.g., in a forwarding database stored in a memory such as an SRAM), then the forwarding of the packet is handled by software, which is much slower. Embodiments described herein seek to reduce the number of packets that are forwarded in software by reducing the time it takes to re-learn entries in hardware after a topology change.

Figure 1A:
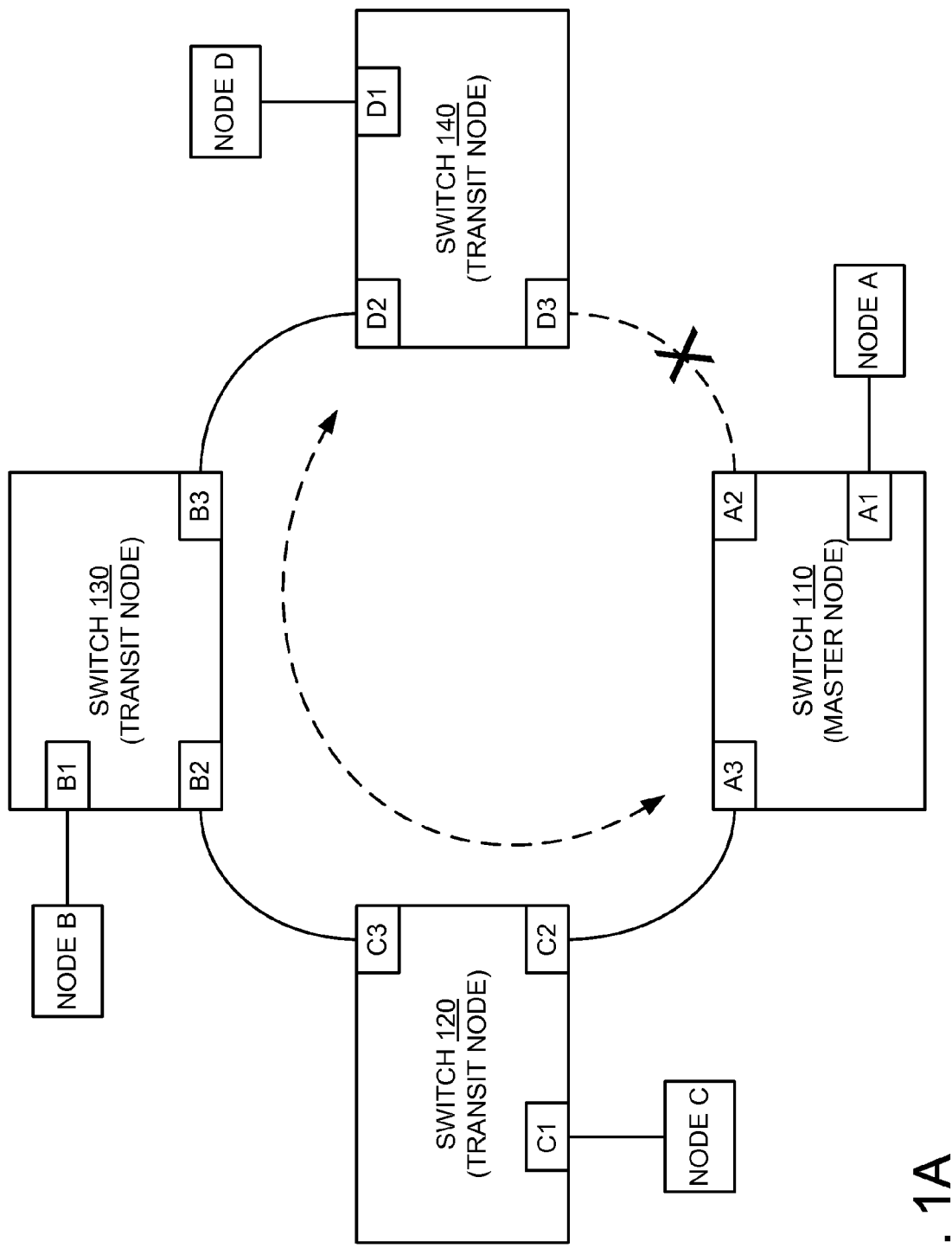
FIG. 1A is a block diagram illustrating a system according to various embodiments.

FIG. 1A is a block diagram according to various embodiments. FIG. 1A illustrates an example of a network. Network 100, as shown, is a ring network. However, other types of networks can be used in different embodiments. In particular, network 100 includes an Ethernet Automatic Protection Switching (EAPS) domain. Other domains (e.g., a Spanning Tree Protocol, or STP, domain) could also be used in other embodiments. With the EAPS domain, Network 100 can be implemented as a virtual local area network (VLAN) or other known network. Network 100 includes a master node at switch 110 and various transit nodes at switches 120, 130, and 140. As the master node, switch 110 includes both a primary port (A3) and a backup port (A2) for forwarding packet traffic on network 100. By blocking the back-up port (A2) on switch 110, a loop-free topology is maintained on network 100.

In the topology of FIG. 1A, for packet traffic to travel between node A and node D, packet traffic must be routed from node A through switch 110 and then switch 120, switch 130, and then to switch 140, where the traffic is forwarded to node D. In particular, if a packet arrives at switch 100 from node A, having a destination address of node D, switch 110 will perform a forwarding database lookup to lookup the destination address of node D in its forwarding database table. Under normal operation, as shown in FIG. 1A, the lookup of the forwarding database for switch 110 will show that the packet should be forwarded out on port A3. When the packet arrives at each of the subsequent switches, similar forwarding database lookups are performed to determine the correct port for forwarding the packet and the packet eventually reaches switch 140. A forwarding database lookup of switch 140 indicates that the packet should be forwarded out on port D1 to reach node D.

In various embodiments, forwarding database entries are learned, or stored, to the forwarding database. In one type of learning, addresses are learned when packets arrive at an ingress port of the switch. For example, if a packet arrives on port A3 from node B, then port A3 will record in its forwarding database (FDB) that the packet was received from node B. In the future, switch 110 will forward packets to node B on port A3 based on a forwarding database lookup. In various embodiments, each port on a switch maintains a forwarding database. However, a single FDB could be maintained for a network device in other embodiments.

Figure 1B:
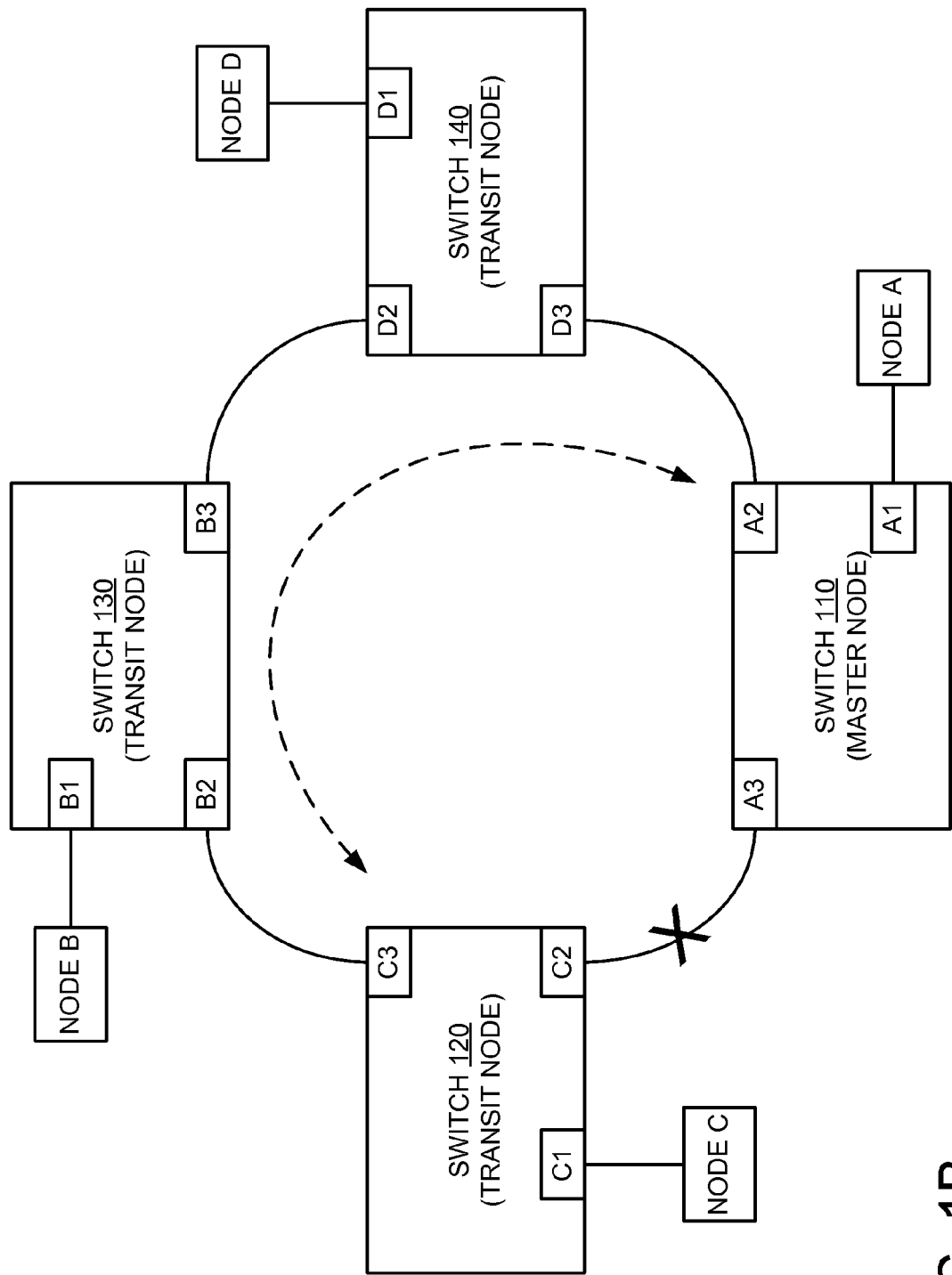
FIG. 1B is a block diagram illustrating a system according to various embodiments.

FIG. 1B is a block diagram according to various embodiments. FIG. 1B illustrates a topology change in network 100. Whereas, in FIG. 1A, switch 110 blocked its backup port A2 to prevent an infinite loop on the ring network, FIG. 1B shows that the link between port B3 on switch 110 and port C2 switch 120 has failed. To keep traffic flowing on network 100, the master node at switch 110 opens up its back-up port (A2) and allows a link to be established between port A2 on switch 110 and port D3 on switch 140. In response to this topology change, the master node at switch 110 generates a forwarding reference that is distributed to the other nodes in network 100. In various embodiments, the forwarding reference is a 12-bit field that is programmed into the <ingress port, VLAN> table on each network device. The forwarding reference includes a destination identity (or outgoing port) and a flood bit. A flood bit, as used herein, refers to a bit that indicates, based on its binary state, whether to flood packets seeking to be forwarded to a particular destination address.

The forwarding reference is propagated to all nodes in the network that are affected by the topology change, which, in this case, includes all four switches in network 100. Ports that are "affected" by the topology change include any ports for which traffic flow changes in response to a topology change, even if just one forwarding entry associated with the port is affected. Once the forwarding reference has been received by each of the switches, subsequent packets that arrive at the respective switches will trigger a forwarding database lookup that will yield the forwarding reference. Given that the forwarding reference includes a flood bit, all packets on network 100 will be flooded on all ports to ensure that the packets reach their destination in spite of the failed link between port B3 of switch 110 and port C2 of switch 120. As used herein, this initial flooding may be referred to as "force" flooding. In various embodiments, the force flooding starts nearly instantaneously after a topology change is detected to ensure minimal packet loss on network 100.

Each of the switches in network 100 includes a special purpose bit array associated with the forwarding database entries. This bit array, referred to herein as an age-bit array, maintains a single bit for each of the forwarding database entries. In some embodiments, more than one bit in the age-bit array can be used for each forwarding database entry. The bits in the age-bit array indicate whether a valid forwarding address exists for the associated forwarding database entry. By clearing the age-bit array in response to detecting a topology change on the network, all entries stored in their respective databases are effectively rendered invalid. Accordingly, any entry for which the corresponding age-bit has been cleared (or reset) in the age-bit array will result in packet flooding on the network. In other words, when a packet arrives at a switch and the destination address of the packet (from the packet header) is searched in the forwarding database, the entry corresponding to that destination address will indicate an invalid entry and, thus, that packet will be flooded out to network 100.

As packets are flooded on network 100, forwarding database entries are relearned and age bits associated with those entries are updated in the age-bit array to indicate valid forwarding database entries. Thus, when future packets arrive and hit a particular entry resulting from a forwarding database lookup, if the age bit corresponding to the entry has since been updated to indicate a valid entry, then that packet can be forwarded based on the forwarding database entry without flooding the packet.

Figure 2:
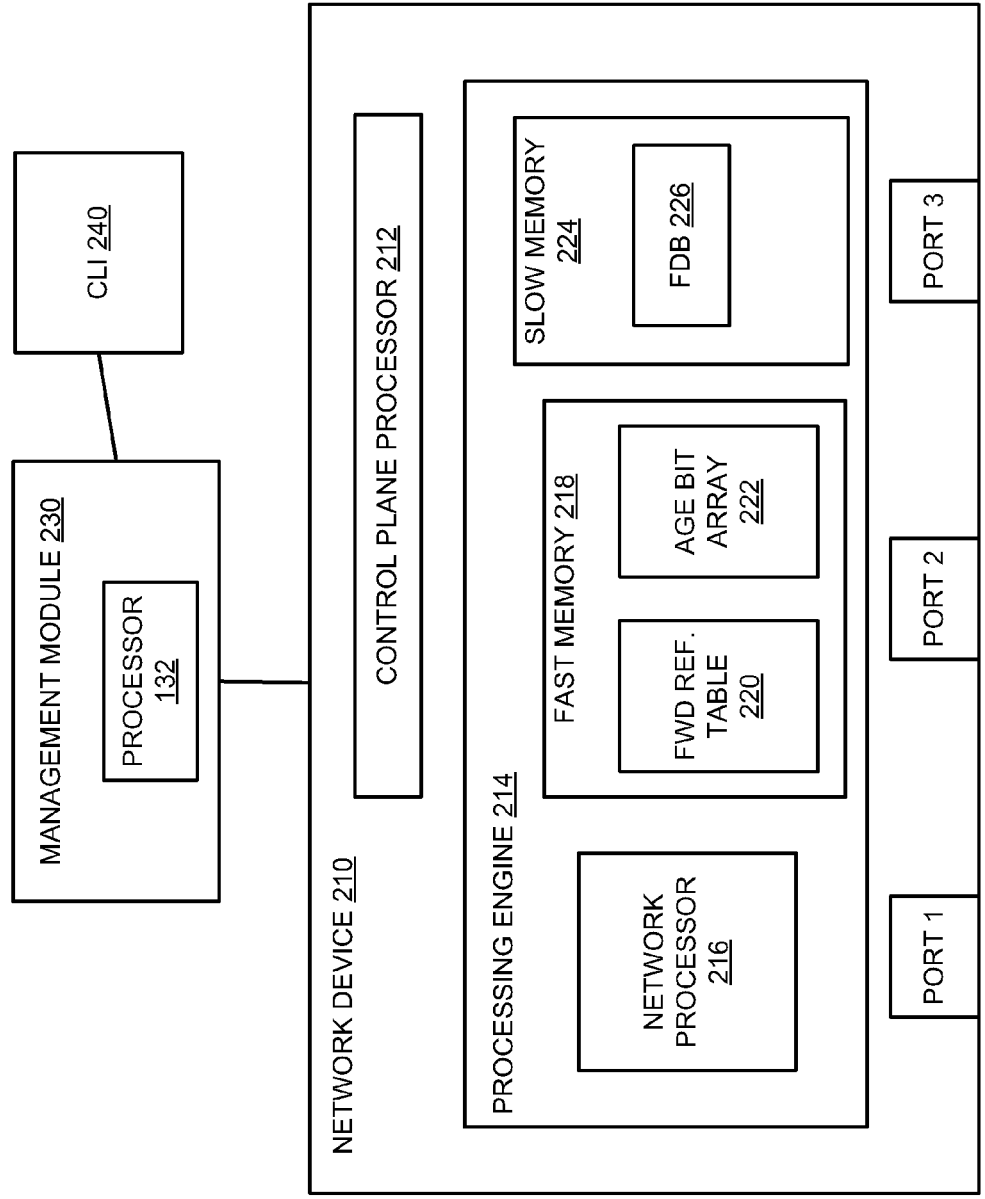
FIG. 2 is a flow diagram of operation in a system according to various embodiments.

FIG. 2 is a block diagram illustrating a network device according to various embodiments. A network device, as used herein, can be any device on a network that sends and/or receives network packet traffic. Examples of a network device include, for example, Open Systems Interconnection (OSI) layer 2 bridges, layer 3 switches (or "routers"), and other known routing/forwarding devices. Network device 210 includes a control plane processor 212 that communicates with a management module 230. Processing engine 214 includes a network processor 216, a fast memory 218, and a slow memory 224. Fast memory 218 can be any type of memory that runs fast in comparison to other types of memory, such as, for example, SRAM. Slow memory 224 might include other types of memories, such as, for example, DRAM, or a content addressable memory (e.g., a ternary CAM, or TCAM). One of skill in the art will appreciate that "fast" and "slow" types of memory are not necessary in various embodiments. In other words, in various embodiments, a single type of memory can be used to perform the various functions described herein.

When a packet arrives on one of the port of network device 210, network processor 216 initiates a lookup of forwarding database 226. Based on a forwarding reference in forwarding table 220 that indicates a recent network topology change, network processor 216 initially floods the incoming packet out on all ports of network device 210. Thus, if the packet is received on port 1, then the packet is flooded back out on both ports 2 and 3. The forwarding reference in forwarding reference table 220 indicates whether a particular port is affected by the topology change and should, therefore, require flooding on that port. However, after age-bit array 222 has been cleared, it serves to either confirm that flooding should continue on a particular port, or that the flooding should be overridden and terminated. For example, if the age bit in the age-bit array indicates a particular entry is valid, then flooding should be terminated. Thus, based on the combination of information in both the forwarding reference table 220 and the age-bit array 222, network processor 216 conditionally floods packets on ports of network device 210.

Network processor 216 terminates flooding associated with a forwarding entry based on the state of the bit in age-bit array 222 corresponding to the forwarding entry. In other words, if the age bit indicates that the corresponding entry is valid, then network processor 216 will forward the packet according to the forwarding database entry. If, however, the age bit indicates that the forwarding entry is invalid, then processor 216 will continue to flood packets associated with the forwarding entry on outgoing ports of the network device 210.

In addition to performing forwarding database lookups for destination addresses of incoming packets, network processor 216 also logs the source address of an incoming packet to update, or add, a forwarding database entry for that source address. For example, if a packet arrives on port 1 of network device 210 and the forwarding entry for the source address shows that it corresponds to port 2, network processor 216 will update the entry for that source address to port 1 (given that the packet has just arrived on port 1). This relearning of the forwarding entry for that particular source address coincides with network processor 216 updating the age bit in the age-bit array 220 for that particular forwarding database entry to indicate that the entry is valid.

Whenever a packet generates a hit on a valid forwarding database entry, network processor 216 refreshes the state of the age bit for that particular forwarding entry to confirm that the entry is valid. It should also be noted that both the force flooding and the subsequent conditional flooding are limited to ports that are affected by the topology change. The clearing of the age-bit array clears the age bits for all ports, including those that are unaffected by the topology change. However, because the forwarding reference from forwarding reference table 220 effectively flags affected ports with a flood bit, unaffected ports (i.e., those which have not been flagged by the forwarding reference) will have entries that generate hits. When a hit is generated for a forwarding entry during conditional flooding, the age bit associated with respective forwarding database entry is simply updated to indicate a valid entry and the packet is forwarded as normal. In this way, processing speed and convergence times are reduced.

Figure 3:
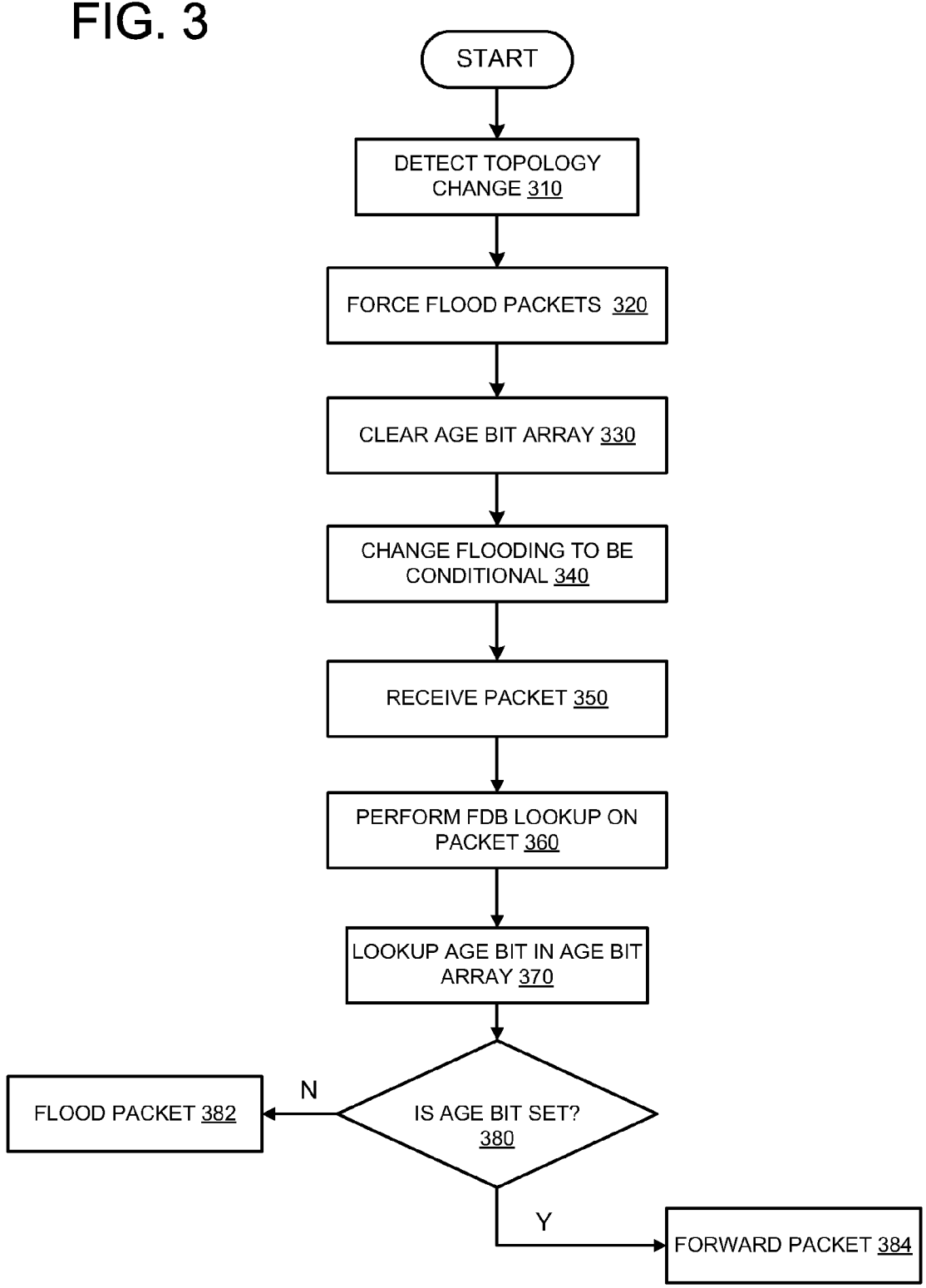
FIG. 3 is a block diagram illustrating a system according to various embodiments.

FIG. 3 illustrates a flow diagram of operation according to various embodiments. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible. Additionally, it will be understood that not all operations illustrated and discussed are necessary in every embodiment—some operations may be optional.

A topology change is detected 310 for a network. Based on the detected topology change, a network device enters a state where all packet traffic is force-flooded 320 to the network. It is to be understood that force-flooding involves sending copies of a packet out on all outgoing device ports associated with the network with the exception of the port on which the packet was received). In various embodiments, the force flooding is triggered by adding a forwarding reference to affected ports of a network device. The forwarding reference might include a destination ID (e.g., an outgoing port) and a force flood bit indicating the force flooding.

Almost instantaneously, after the topology change is detected, an age-bit array on the network device is cleared 330. Entries stored in the forwarding database for the network device are essentially rendered invalid by the clearing of the age-bit array. The age bit array includes at least one bit for each forwarding entry. Clearing the age bit array is not synonymous with flushing the forwarding entries from hardware. Clearing the age bit array is fast and easy, whereas flushing entire forwarding entries is much more cumbersome. By specifically avoiding having to flush forwarding entries, processing and/or convergence time is reduced.

In connection with the clearing of the age-bit array, the flooding state is changed 340 from force flooding to conditional flooding. In various embodiments, the force flooding is deactivated by clearing the force flood bit in the forwarding reference. A conditional flood bit might also be enabled to affirmatively trigger the conditional flooding.

While in conditional flood mode, a forwarding database lookup is performed 360 on a packet received 350 by the network device. In other words, a destination address in the header of the packet is used to lookup a forwarding entry in hardware. According to the conditional flooding rules, a lookup of the age-bit associated with the forwarding entry is also performed 370. If the age bit is set to indicate a valid destination address, the packet forwarded 384 according to the forwarding entry. If, however, the age-bit indicates an invalid destination address, the packet is flooded 382 on ports of the network.

Initially, after the age-bit array is cleared 330, the first several packets to hit the switch will result in a lookup that yields an invalid entry based on the age-bit. However, as packets are flooded through the network, forwarding entries are continuously picked up and re-learned. Once an entry is re-learned, the status of the age-bit is changed to indicate a valid entry. Thus, subsequent packets that generate a hit on a particular entry can be forwarded without flooding if the age-bit corresponding to the relevant forwarding entry has been updated to indicate validity.

In embodiments where a conditional flood bit is used to trigger the conditional flooding mode, a timer can be used to limit the length of time for conditional flooding. For example, the conditional flooding mode could have a 5 minute timer—after 5 minutes, the network device could revert to a non-flooding mode. It is possible that certain nodes on the network may have remained silent during the 5 minute period and thus will not have been relearned (e.g., the age-bit for these entries will not have been set to indicate a valid entry). Accordingly, entries that are not valid (e.g., based on the age-bit) may be deleted after the timer for the conditional flooding expires.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, or other type of machine-readable media suitable for storing electronic instructions. For example, embodiments of the invention may be downloaded as a computer program which may be transferred from a memory on a remote computer (e.g., a server) to a memory on a requesting computer (e.g., a client).

Various components described herein may be a means for performing the functions described herein. Each component described herein includes software, hardware, or a combination of these. The operations and functions described herein can be implemented as software modules, hardware modules, special-purpose hardware (e.g., application specific hardware, application specific integrated circuits (ASICs), digital signal processors (DSPs), etc.), embedded controllers, hardwired circuitry, etc.

Aside from what is described herein, various modifications may be made to the disclosed embodiments and implementations of the invention without departing from their scope. Therefore, the illustrations and examples herein should be construed in an illustrative, and not a restrictive sense.

What is claimed is:

1. A computer-implemented method in a network device, the method comprising:
    maintaining an age-bit array in a memory of the network device, the age-bit array comprising an age-bit for each of a plurality of forwarding entries of the network device, each of the age-bits in the age-bit array indicating whether a corresponding one of the plurality of forwarding entries is valid;
    initially flooding packets on ports of the network device in response to a topology change in a network;
    clearing the age-bit array responsive to the topology change rendering the plurality of forwarding entries of the network device as invalid; and
    conditionally flooding packets on the ports of the network device responsive to the clearing of the age-bit array, wherein the conditional flooding comprises one of the following operations for each port among the ports of the network device:
        a) confirming that flooding should continue on the port based on the age-bit associated with the forwarding entry for the port being cleared indicating the forwarding entry is invalid; and
        b) terminating flooding on the port based on the age-bit associated with the forwarding entry for the port indicating the forwarding entry has been re-learned and is valid.

2. The computer-implemented method of claim 1, wherein the network is a virtual local area network.

3. The computer-implemented method of claim 1, further comprising:
    setting the state of an age-bit in the age-bit array for a forwarding entry to indicate valid when the forwarding entry is learned on the network device.

4. The computer-implemented method of claim 3, further comprising:
    refreshing the state of the age-bit for the forwarding entry in the age-bit array when a packet processed by the network device generates a hit for the forwarding entry.

5. The computer-implemented method of claim 1, wherein the initial flooding and the conditional flooding are limited to ports of the network device affected by the topology change.

6. The method of claim 1, wherein initially flooding the packets on the ports of the network device comprises force-flooding the ports by sending copies of a packet out on all outgoing device ports associated with the network device with the exception of a port on which the packet was received.

7. The method of claim 6, wherein the force-flooding is triggered by adding a forwarding reference to affected ports of the network device.

8. A non-transitory computer-readable storage medium containing instructions that, when executed by a processor in a network device, the instructions cause the network device to perform operations comprising:
    maintaining an age-bit array in a memory of the network device, the age-bit array comprising an age-bit for each of a plurality of forwarding entries of the network device, each of the age-bits in the age-bit array indicating whether a corresponding one of the plurality of forwarding entries is valid;
    initially flooding packets on ports of the network device in response to a topology change in a network;
    clearing the age-bit array responsive to the topology change rendering the plurality of forwarding entries of the network device as invalid; and
    conditionally flooding packets on the ports of the network device responsive to the clearing of the age-bit array, wherein the conditional flooding comprises one of the following operations for each port among the ports of the network device:
        a) confirming that flooding should continue on the port based on the age-bit associated with the forwarding entry for the port being cleared indicating the forwarding entry is invalid; and
        b) terminating flooding on the port based on the age-bit associated with the forwarding entry for the port indicating the forwarding entry has been re-learned and is valid.

9. The non-transitory computer-readable storage medium of claim 8, wherein the network is a virtual local area network.

10. The non-transitory computer-readable storage medium of claim 8, wherein the instructions cause the network device to perform further operations comprising:
    setting the state of an age-bit in the age-bit array for a forwarding entry to indicate valid when the forwarding entry is learned on the network device.

11. The non-transitory computer-readable storage medium of claim 10, wherein the instructions cause the network device to perform further operations comprising: refreshing the state of the age-bit for the forwarding entry in the age-bit array when a packet processed by the network device generates a hit for the forwarding entry.

12. The non-transitory computer-readable storage medium of claim 8, wherein the initial flooding and the conditional flooding are limited to ports of the network device affected by the topology change.

13. The non-transitory computer-readable storage medium of claim 8:
    wherein initially flooding the packets on the ports of the network device comprises force-flooding the ports by sending copies of a packet out on all outgoing device ports associated with the network device with the exception of a port on which the packet was received; and
    wherein the force-flooding is triggered by adding a forwarding reference to affected ports of the network device.

14. A network device, comprising:
    a memory to store an age-bit array comprising an age-bit for each of a plurality of forwarding entries of the network device, each of the age-bits in the age-bit array to indicate whether a corresponding one of the plurality of forwarding entries is valid;
    a processor to initially flood packets on ports of the network device in response to a topology change in a network;
    the processor further to clear the age-bit array responsive to the topology change to render the plurality of forwarding entries of the network device as invalid; and
    the processor to further conditionally flood packets on the ports of the network device responsive to the clear of the age-bit array, wherein the conditional flood comprises one of the following operations for each port among the ports of the network device:

a) an operation to confirm that flooding should continue on the port based on the age-bit associated with the forwarding entry for the port being cleared indicating the forwarding entry is invalid; and b) an operation to terminate flooding on the port based on the age-bit associated with the forwarding entry for the port indicating the forwarding entry has been re-learned and is valid.

15. The network device of claim 14, wherein the network is a virtual local area network.

16. The network device of claim 14, further comprising:

the processor further to set the state of an age-bit in the age-bit array for a forwarding entry to indicate valid when the forwarding entry is learned on the network device.

17. The network device of claim 16, further comprising:

the processor further to refresh the state of the age-bit for the forwarding entry in the age-bit array when a packet processed by the network device generates a hit for the forwarding entry.

18. The network device of claim 14, further comprising:

the processor to limit the initial flooding and the conditional flooding to ports of the network device affected by the topology change.

19. The network device of claim 14:

wherein the processor to initially flood the packets on the ports of the network device comprises the processor to force-flood the ports by sending copies of a packet out on all outgoing device ports associated with the network device with the exception of a port on which the packet was received.

* * * * *